United States Patent Office 3,546,953
Patented Dec. 15, 1970

3,546,953
OSCILLATORY SYSTEM WITH TWO
TURNABLE MASSES
Roland Siefert, Bad Durrheim, and Heinz Odenbach, Irslingen, Germany, assignors to Kienzle Uhrenfabriken G.m.b.H., Schwenningen am Neckar, Germany
Filed Oct. 17, 1968, Ser. No. 768,302
Claims priority, application Germany, Oct. 19, 1967, 1,673,664
Int. Cl. F16h 21/44; G10d 13/08
U.S. Cl. 74—96
2 Claims

ABSTRACT OF THE DISCLOSURE

A mounting for the nodal portion of a counter phase oscillator spring. The mounting is resiliently movable at its point of attachment to the oscillator spring, but the movement is restricted by stops.

CROSS REFERENCE TO RELATED APPLICATION

This application deals with improvements in the construction disclosed by one of the present applicants, Roland Siefert, in co-pending patent application Ser. No. 702,905 filed Feb. 5, 1968, now Pat. No. 3,491,258, for oscillatory system with two turnable mass bodies. In general, application Ser. No. 702,905 relates to an oscillatory system, such as may be used to control timepieces and having two independently turnable mass bodies, one of which is driven, mounted on opposite ends of a spring for counter phase turning. The nodal portion of the system is resiliently mounted on a frame carrying the oscillator.

BACKGROUND OF THE INVENTION

Field of the invention

Directly driven mechanical oscillator having counter phase mass bodies connected by a spring with attachment means at the nodal portion of the latter.

Description of the prior art and of said application Ser. No. 702,905

It was pointed out in the prior application that the nodes of the spring need not coincide with the point of attachment of a frequency determining spring to a clockwork frame. It is therefore not necessary, insofar as the point of attachment is concerned, that the two spring halves be equalized to exactly the same frequency. For balancing the system, balancing against only one of the swung masses usually suffices. By means of the elastic connection between spring and frame, the position of the nodes can shift after balancing so that the two spring halves are enabled to oscillate at exactly equal frequency without beats or surges arising in one of the oscillating halves. The allowable alteration in the position of the node in the spring from the position of attachment of the spring to the frame is greater when a softer or more yielding connection to the frame is used. This necessitates then, for a relatively rigid connection between the spring and frame, that the allowable frequency deviation between the two spring halves relative to the fastening point should be only very small. That is to say, the node of oscillation must lie very close to the point of attachment. In the case of a very elastic connection between spring and frame the allowable frequency deviation of both spring halves relative to the attachment point is relatively very large. In other words, the nodes of oscillation can lie relatively far removed from the point of attachment. The last mentioned case allows then a resonance by only one turnable mass for the required value frequency of the oscillator within wide limits.

It has however been demonstrated that during use of such an oscillatory system with a very elastic connection between the spring and frame in movable timepieces, shocks may be produced so that both oscillator halves no longer oscillate in counter phase. The two halves swing rather in the same direction, with the connecting spring participating in the swinging.

This drawback is greatly reduced in the present invention wherein the fastening point on the spring is loosely turnable in a small angular region. A similar concept is embodied in a device wherein the restoring moment on the spring, by the connecting or mounting spring during small departures of the fastening point on the oscillating spring, is very slight and the moment abruptly increases following a predetermined departure from the true path.

The construction of such a device for connection between the spring and frame makes it possible upon balancing of the oscillatory system to the required frequency by balancing only one of the turnable masses, that the allowable out-of-tune of one mass can amount to 10% of that of the other when both are considered with reference to the point of attachment.

As to the node, which can be away from the point of attachment on the spring, both oscillatory halves have exactly the same frequency. Furthermore shocks, as heretofore mentioned, do not cause trouble with the counter swinging.

SUMMARY OF THE INVENTION

In a counter phase mechanical oscillator having two turnable mass bodies on a fixed axis and connected by a biasing spring, the nodal portion of the biasing spring is attached to a fixed point through means of an elastic pin free to bend so that its point of attachment on the biasing spring may shift with respect to the node of oscillation, but the bending movement of the pin is restricted by opposing spaced stops to protect the system against shocks which might allow in-phase oscillation of the two halves of the oscillator.

DESCRIPTION OF THE PREFERRED EMBODIMENTS

Figure 1:
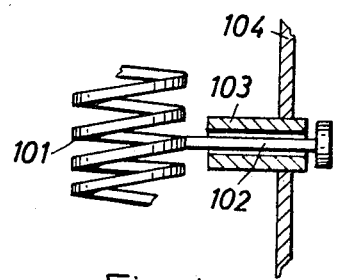
FIG. 1 is a side view showing the pin attached to the biasing spring loosely held in a fixed bushing.

In FIG. 1 the biasing spring 101 with a radial pin 102 fixed thereon in the neighborhood of the node of oscillation, the pin being mounted loosely in a bushing 103 fast on the frame 104. The bushing allows play of about ±3/100 mm. between the pin and the inner walls of the bushing.

Figure 2:
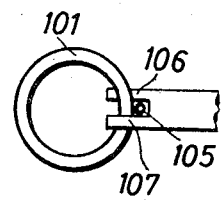
FIGS. 2 and 3 are respectively a plan (with parts removed) and a side view showing the pin restrained by a fork-like member.
Figure 3:
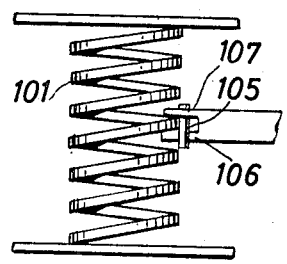

In the form of the invention shown in FIGS. 2 and 3 a pin 105 is connected fast axially parallel to the helical spring 101 near its node. The pin is limited in its possible circular movement by a forked stop having the two prongs 106 and 107 thereof offset to engage opposite ends of the pin. Movement of the pin 105 however, comes into play only when the location of the spring node does not coincide with the point of mounting of the pin on the biasing spring. The amount of play of the pin 105 is again only about ±3/100 mm.

Figure 4:
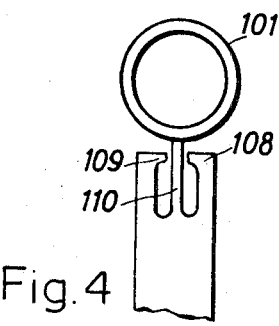
FIG. 4 shows the pin integral with a fork member.

In FIG. 4 the movement of the fastening spring 110 is limited by the stops 108 and 109 on an integral mount. The return movement before there is any engagement on stops 108 and 109 is relatively small, while in the case of larger deviations, owing to the engagement of the spring 110 on the stops 108 and 109 its active length is shortened.

Figure 5:
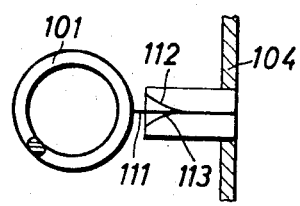
FIG. 5 shows the pin constrained in flared bushing.

In FIG. 5 the spring 111 disposed in a bushing fixed on the frame, the bushing has a bore whose walls at 112 and 113 flare at the outer end in a shape similar to that of the bell of a trumpet. The bending of the spring 111 against the walls at 112 and 113 produces a progressive shortening of the effective length of the pin.

In all forms of the invention mass bodies are connected to the helical spring at the respective ends thereof as shown in FIG. 3. Driving means are disclosed in said application Ser. No. 702,905 and are conventional.

We claim:

1. In a counter phase oscillator for the control of timepieces wherein the oscillator has independently turnable mass bodies mounted for oscillation about an axis fixed with reference to the timepiece frame and the bodies are secured to the respective ends of a helical spring and the nodal portion of the oscillator is loosely held relative to the frame, the improvement comprising, restraining means fixed on the nodal portion of the oscillator and on the frame for limiting the turning of the nodal portion of the spring about the axis to a small angle to prevent in-phase turning of the bodies, the angle being about ±3/100 mm., as measured by movement of the nodal portion at the point of fixture on said means about the axis of the spring.

2. In a counter phase oscillator for the control of timepieces wherein the oscillator has independently turntable mass bodies mounted for oscillation about an axis fixed with reference to the timepiece frame and the bodies are secured to the respective ends of a helical spring and the nodal portion of the oscillator is loosely held relative to the frame, the improvement comprising, restraining means fixed on the nodal portion of the oscillator and on the frame for limiting the turning of the nodal portion of the spring about the axis to a small angle to prevent in-phase turning of the bodies, said means being an elongated element secured fast on the nodal portion, and a bush tube receiving the element therethrough and fast on the frame and open toward the spring and having inner wall portions facing the element in opposite directions and loosely receiving the element therebetween, whereby engagement of the element with the wall portions limits turning of the element and the nodal portion of the spring.

References Cited

UNITED STATES PATENTS

| 329,090 | 10/1885 | Segrove | 84—457 |
| 2,520,520 | 8/1950 | Woodard | 84—457 |
| 2,581,963 | 1/1952 | Langloys | 84—409 |
| 3,339,007 | 8/1967 | Shapiro | 84—457 |
| 3,425,210 | 2/1969 | Barth | 58—23 |
| 3,322,016 | 5/1967 | Ishikawa et al. | 84—457 |

WESLEY S. RATLIFF, JR., Primary Examiner

U.S. Cl. X.R.

84—409